UNITED STATES PATENT OFFICE.

HERBERT TOLPUTT, OF SHEFFIELD, ENGLAND.

POLISHING MIXTURE OR COMPOSITION.

1,057,187. Specification of Letters Patent. Patented Mar. 25, 1913.

No Drawing. Application filed July 1, 1912. Serial No. 707,139.

*To all whom it may concern:*

Be it known that I, HERBERT TOLPUTT, tool engineer, a subject of the King of Great Britain, residing at Heeley Mills, Saxon road, Sheffield, England, have invented a certain Improved Polishing Mixture or Composition, of which the following is a specification.

This invention relates to a new or improved mixture or composition for use in polishing metals and such-like substances whereon it is desired to produce a bright or highly polished surface.

Heretofore polishing compositions have generally consisted or have been composed of tallow, stearin, or other greasy material as a base to which latter have been added, crocus, rouge or other so-called polishing powder and this mixture then poured or molded into a stick or other desired form and allowed to cool and in making the aforesaid mixture in one instance it has been stated that unslaked lime may be added in such composition but that there would then be certain drawbacks in this mixture notably that the moisture of the air would effect a slaking of the lime and injuriously affect the greasy substance and thereby rendering the composition useless for polishing purposes; and moreover even before such deterioration occurred in such previously known composition the latter could not produce a bright and highly polished surface or effect a polishing action or result such as can be achieved by means of a mixture or composition according to my present invention and this also is the case with other hitherto proposed polishing compositions in which in one instance it has been proposed to mix soft soap or glycerin dissolved in water which is to be used for reacting on carbid of calcium to produce acetylene gas and the refuse or sludge to be employed for metal polishing, while in another instance it has been proposed to make a composition of stearin and calcined magnesia and an oil for use as a metal polish.

My improved composition consists of a mixture of a suitable hydrated oxid, preferably admixed with powdered metallic lead, and an agglutinant binder, such as stearin, tallow, vaseline, etc. The composition can be advantageously produced by maintaining a supply of stearin, or other fatty binder, at a temperature somewhat above its melting point, and in stirring such melted binder while gradually adding thereto a suitable amount of thoroughly slaked and disintegrated lime admixed with powdered metallic lead. I have found that a highly advantageous composition is produced by mixing with the binder four or five times of its weight of slaked lime and a relatively small amount of powdered metallic lead.

This mixture or composition may then be run into suitable molds, shapes or receptacles and allowed to solidify. I may pack or introduce the said mixture and store it in airtight or vacuum receptacles or I may coat the mixture in suitable sized masses with a protective coating (*e. g.* with varnish) which may be readily removed before or during use.

What I claim is:—

1. The herein described polishing composition, consisting of a hydrated oxid and powdered metallic lead incorporated with an agglutinant binder.

2. The herein described polishing composition, consisting of thoroughly slaked and disintegrated lime, and powdered metallic lead, and stearin.

In witness whereof I have hereunto set my hand in presence of two witnesses.

HERBERT TOLPUTT.

Witnesses:
BENJAMIN ELLIS,
HORACE SLATER.